US005241642A

United States Patent [19]

Norsworthy et al.

[11] Patent Number: 5,241,642

[45] Date of Patent: Aug. 31, 1993

[54] IMAGE MEMORY CONTROLLER FOR CONTROLLING MULTIPLE MEMORIES AND METHOD OF OPERATION

[75] Inventors: John P. Norsworthy, Carrollton; David T. Stoner, McKinney; Michael K. Corry; David M. Pfeiffer, both of Plano, all of Tex.

[73] Assignee: Pixel Semiconductor, Inc., Plano, Tex.

[21] Appl. No.: 414,139

[22] Filed: Sep. 28, 1989

[51] Int. Cl.[5] .............. G06F 12/04

[52] U.S. Cl. .............. 395/425; 395/164; 395/166; 395/400; 395/725; 364/DIG. 1; 364/243; 364/243.6; 364/245.1; 364/246.7

[58] Field of Search ... 395/164, 165, 166, 400 MS File, 395/425 MS File; 364/200 MS File, 900 MS File

[56] References Cited

U.S. PATENT DOCUMENTS 4,376,972 3/1983 Johnson et al. .............. 395/425
4,571,676 2/1986 Mantellina et al. .............. 364/200
4,679,167 7/1987 Finnell .............. 364/900
4,829,420 5/1989 Stahle .............. 364/200
4,908,789 3/1990 Blokkum et al. .............. 395/425
4,980,850 12/1990 Morgan .............. 395/425
4,985,871 1/1991 Catlin .............. 365/230.06

*Primary Examiner*—Joseph L. Dixon
*Assistant Examiner*—Frank J. Asta
*Attorney, Agent, or Firm*—Baker & Botts

[57] ABSTRACT

There is disclosed a memory controller for controlling addresses to a plurality of different memory types while treating the memory system as a whole so as to create a unified addressing arrangement. The controller is structured to allow for a reprogramming of the split address between the memories and for maintaining contiguously addressed locations. A register is used to hold the split address and the register can be updated at initialization to vary the split depending upon physical memory changes. The controller also maintains a common bit length addressing word regardless of the memory size being addressed by the system processor.

18 Claims, 2 Drawing Sheets

IMAGE MEMORY CONTROLLER FOR CONTROLLING MULTIPLE MEMORIES AND METHOD OF OPERATION

TECHNICAL FIELD OF THE INVENTION

This invention relates to processing systems and more particularly to an image memory controller for use in controlling multiple memories in a unified addressing space.

BACKGROUND OF THE INVENTION

Image processing requires a great amount of data movement. This data, in addition to being moved between memories and processors, must be manipulated and processed quickly. As systems become more and more sophisticated, the need for speed of operation continually increases. This requirement translates into the need for ever increasing band width or data transfer capability.

Coupled with the data movement and manipulation capability of imaging systems is the need for specialized memory to handle data transfers (pixels) to the video screen or to another output device. Thus, it has become typical to establish a VRAM (video random access memory) with enough memory capacity to hold data pixels on a one-for-one basis with the video screen. This VRAM has certain operating characteristics which allow for efficient data storage and transfer to the screen.

In an imaging system it is necessary to store images which are not to be presented to the screen but which are subject to the performance thereon of manipulations. Because DRAM (dynamic random access memory) is typically more economical and often faster than VRAM, it is desirable to process the off-screen images in a DRAM as opposed to a VRAM. This then argues for having two memory types, a VRAM for those images to be displayed, and a DRAM for storing the remainder of the images.

A problem is presented when trying to use more than one memory type in that the programmer must keep track of the timing and control, and much information must be passed to the different memory controllers to efficiently process the images. Also, because the memory capacities of each memory type are typically different, different address sizes are necessary and different control timing would apply to each memory type.

Thus, it is desirable to arrange a processing system with a single memory controller to process information to and from memories having different characteristics, such as memory size and cycle times, and even different addressing capability.

When attempting to use a single memory controller for two imaging memories, the problem of address space utilization must be resolved, together with the problem of making the controller transparent to the system programmer. The transparency is a particularly difficult problem since many parameters must be variable if a single controller is to handle two or more different memories. One requirement for any memory system is that the system be capable of handling the memory such that there is a continuity of memory address locations from one memory to the other without gaps between the memories. This is difficult to achieve when it is realized that memories having different addressable locations also must consequently be addressed using a different number of address bits.

A further problem is presented in that when two memories are used, the question arises as to how large each memory is to be. To say this another way, the question is where the split between the memories is to occur. Often it happens that it is desirable to increase the addressable space of one or the other of the memories, and when contiguous addressing is utilized this becomes a serious problem.

Thus, there is needed in the art a single memory controller which is capable of handling the addressing and control functions for a plurality of memory types having diverse operating characteristics.

SUMMARY OF THE INVENTION

These and other problems have been solved by us by designing a single memory controller to handle multiple memories. The controller functions with two or more memories which are arranged having a single addressing space so that they will function as though they were single memory. This then allows the programmer to treat the memory space as a single entity having contiguous memory space. The system then operates to move the data to or from the proper place, whether it be in VRAM for screen presentable data or in DRAM for off-screen image data.

The system is arranged so that the split between addresses which belong to VRAM and addresses which belong to DRAM is programmable. In this manner, then, if more VRAM is needed for a particular hardware implementation, as for example, if a screen requiring more pixels is to be used, a number in a register is changed, and the address split between VRAM and DRAM is automatically changed.

In the typical situation, a particular split is set up at initialization time of the system from code built into the system. Thus, the programmer need not take notice of the hardware requirements, other than to know the pixel count for the screen for programming purposes. For different configurations of pixels the initialization code is changed thereby allowing for a different VRAM size or more or less DRAM.

In order to make the memory controller more universal, the parameters that can change between memories, such as speed, size, address configuration, cycle time, etc., are also controlled by registers which can be set. Thus, the dual memory controller can be made to serve a wide variety of memories having a wide variety of operating characteristics.

Accordingly, it is one feature of the invention to provide a dual image memory controller which makes the memory configuration transparent to the user and which allows for variable programmable splits between the addressable sizes of each memory.

It is another feature of the invention to provide such a dual memory controller which allows for transparency to the system user and which uses an address word length which is common to all memory types even though the address word length for each memory is different all while still maintaining contiguous addressing capability for the entire memory system.

While we have discussed the operation of the inventive concept in terms of two memories, the system can be made to work for many memories. One method of accomplishing this would be to perform additional subtractions at other break points, adjusting the memory control bits each time.

Also, while registers are shown which contain the split information, systems could be devised such that the split address information is obtained on a cycle by cycle basis or on a periodic basis. Also, the memory type is not important and as technology changes this invention will be useful for allowing memories to be changed without requiring reworking the entire system.

BRIEF DESCRIPTION OF THE DRAWINGS

Further aspects of the invention and their advantages will be discerned by reference to the following detailed description in conjunction with the appended drawings, in which.

DETAILED DESCRIPTION OF THE INVENTION

Figure 1:
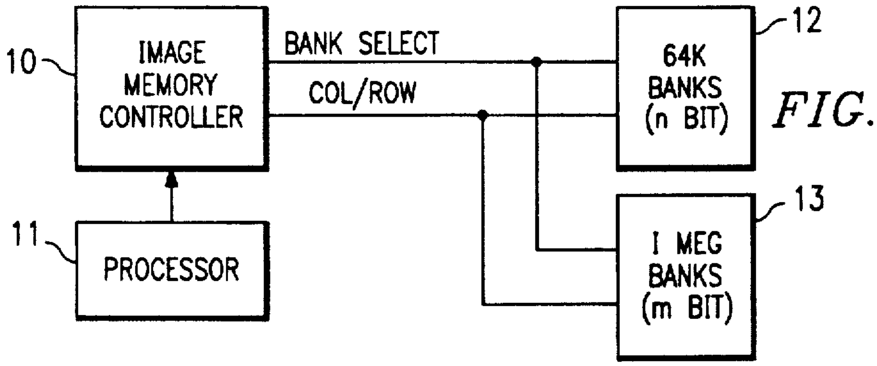
FIG. 1 shows a schematic view of the overall image memory control.

Turning now to FIG. 1, there is shown an image memory controller 10 which obtains address information from processor 11 and converts that address information into row and column select bits and bank select bits for memory 12 or for memory 13. Memory 12, in the embodiment, is a series of 64K memory banks, while memory 13 is a series of one meg memory banks. The memories can have any number of banks and the control between the two is established, as will be seen, by image memory controller 10.

Figure 2:
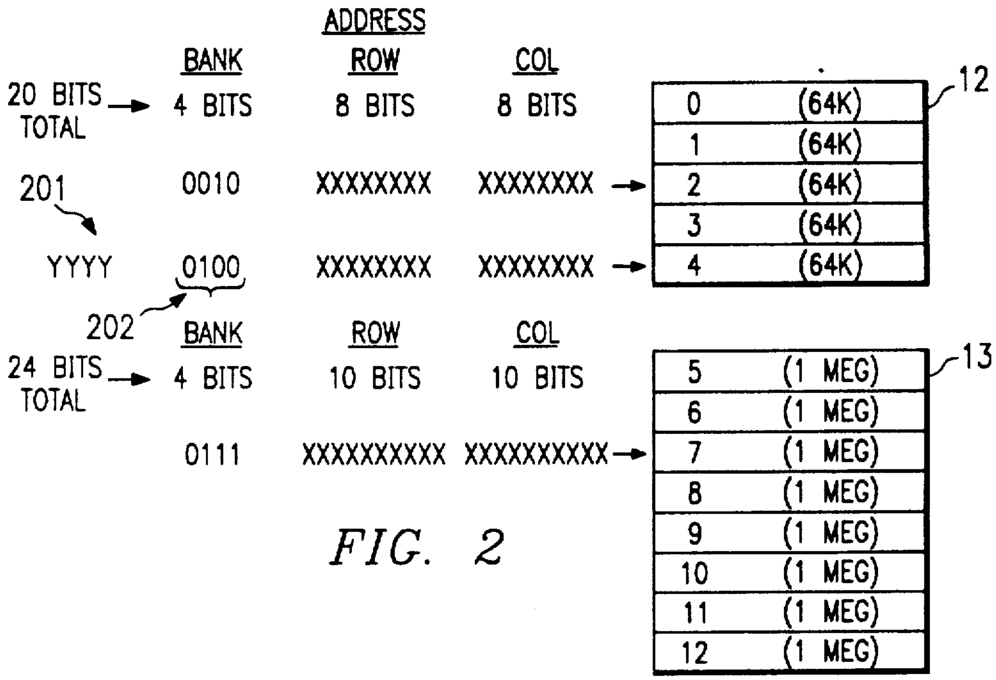
FIG. 2 is a representation of two memories having different addressing space.

FIG. 2 demonstrates the problem when a single image memory controller attempts to address two different memories, each having a different address size. As shown, memory 12 comprises five 64K memory chips, or sections, called "banks" and is addressed by an 8-bit column address, an 8-bit row address and a 4-bit bank address. This is 20 bits total. However, memory 13 comprises eight one meg memory chips, or banks, and is addressed by a 10-bit column address, a 10-bit row address and a 4-bit bank address. This gives a minimum of 24 bits in the address word for memory 13. Given the fact that a common length memory word is necessary for both memories it follows that at a minimum 24 bits are necessary. However, the problem then arises as to breaking the 24 bits into the proper sizes for presentation to the diverse memories, since memory 12 requires 8-bit row and column mode while memory 13 requires 10-bit row and column words.

The single memory, as discussed, uses a 24 bit address to access memories 12 and 13. When addressing memory 12 the upper 4 bits (Y, Y, Y, Y) of the address are zero and may be discarded. If the memories in this example were to be utilized without some special control function, then an address bit would have to be dedicated to detecting the boundary between memories 12 and 13. In this example, bit 201 would be used because it is more significant than the 20 lower bits required for addressing memory 12. Therefore, if memory 12 does not contain the full 16 banks accessible by the four bank bits 202 the programmer would have a large section of memory (the difference between the number of banks actually provided and sixteen) which has address capability (because of the four bank bits) but no memory associated therewith.

Figure 3:
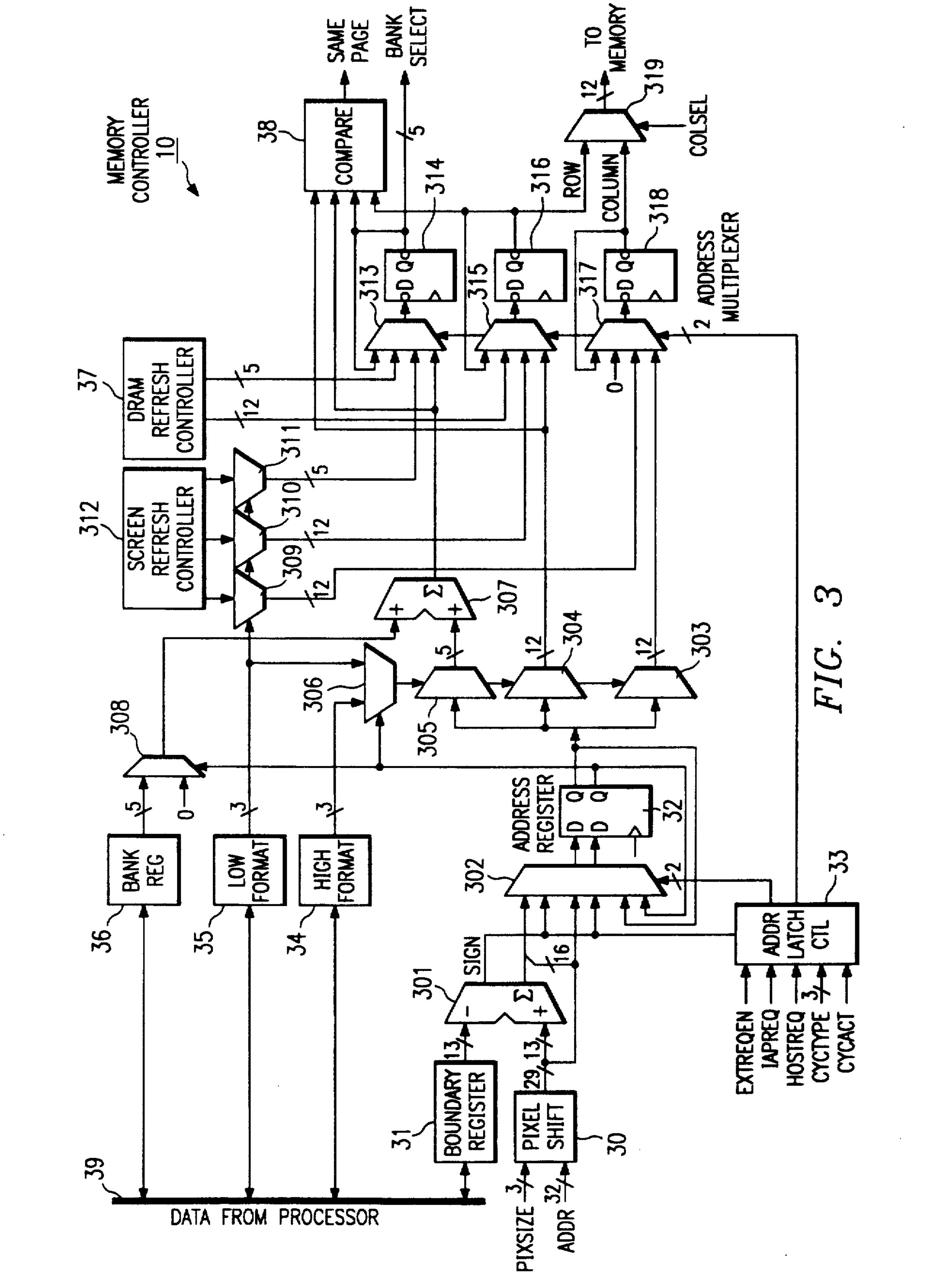
FIG. 3 is the detailed schematic of the memory controller.

This problem has been overcome by memory controller 10, as will be seen beginning with FIG. 3 with reference to FIG. 2, where the boundary address between the two memories is stored in register 31. Everytime an address is provided, a determination is made as to whether the address is in memory 12 or memory 13. This determination is made based upon the stored address. This is done by subtraction as will be seen. After the subtraction is accomplished, and it has been decided as to which memory, 12 or 13, the address belongs, then the bank is selected by maintaining the lowest bank number of memory 13 in bank register 36 and then adding that number to the address bits that are obtained from the processor. This operation will be seen from that which is to follow.

Continuing in FIG. 3, at system initialization, prior to the system operation, the controller must be initialized. This is accomplished by receiving data over bus 39 from the processor to be loaded into boundary register 31. This data is the memory address of the boundary between the two memory types., For discussion purposes, we will assume that this boundary has the data equivalent of 50,000 h(hex). At the same time, bank register 36 is also loaded with the value of the first bank of the high portion of memory. Next, low format register 35 is loaded with the control value for the type of row/-column address structure being used for memory 12. Then the high address format register 34 is loaded with the control value for the row/column address structure being used for the memory 13.

We will assume now that we are getting ready to address the memory structure from the processor. In such a situation, the address comes in over the ADDR lead to pixel shifter 30. When the address comes in to the pixel shifter, the pixels are shifted based on the pix size value from the processor, and then passed on to subtraction unit 301. Subtraction unit 301 is operative to subtract the value stored in boundary register 31 from the address as contained in pixel shifter 30. The output of subtractor 301 goes to multiplexer 302. The input of multiplexer 302 also has the address information directly from the output of pixel shifter 30.

The selection between the two inputs to multiplexer 302 is accomplished by address latch control 33 operating in response to the sign of the subtractions as obtained from subtractor 301. If the sign is negative, which indicates that the boundary register address 50,000 h is larger than the provided address, then address latch control 33 selects the output directly from pixel shifter 30. If the subtracted result is positive, then the output of subtractor 301 is selected by address latch control 33 and is provided by multiplexer 302 to address register 32. Thus, the first step in determining the form of the actual address is the decision as to whether the provided address is lower than 50,000 h or higher than, or equal to, 50,000 h. If it is lower than 50,000 h, it is used directly as it comes from the processor. If it is higher than, or equal to, 50,000 h, then the address is used after 50,000 h has been subtracted from it. The purpose of this subtraction will be clearer from that which is to follow. It should also be remembered that the selection of 50,000 h is only for discussion purposes and is not intended to be an actual boundary address.

Figure 4:
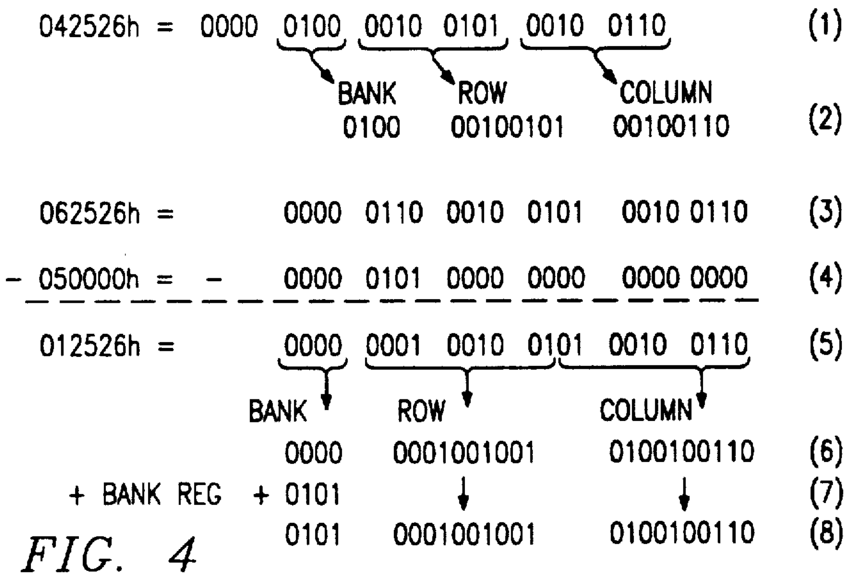
FIG. 4 is a bit pattern for addresses destined for different size memories.

Turning for a moment to FIG. 4, and assuming that the hexadecimal address 42526 h, has been transmitted from the processor to pixel shifter 30 of FIG. 3 (line 1 of FIG. 4). A subtraction of 50,000 h is made, and the subtraction comes out negative number. In this situation, the number 42526 h is used directly as shown in line 2 of FIG. 4. Under this situation, and starting from the right the first eight bits are the column bits, the next eight bits are the row bits, and the next four bits are the bank bits, all as shown in line 2 of FIG. 4. Note that the far left four bits of line 1 of FIG. 4, which are 0000 are the Y bits discussed with respect to FIG. 2.

Now, assume that the presented address is 62526 hex, as shown in line 3, and 50,000 h is subtracted from that address number. In such a situation, the sign of the result would be positive giving a signal that the presented address is in the memory at a location higher than the assigned split. In our example, this would indicate that the desired address is in memory 13. This then yields the results shown in line 6 of FIG. 4, with the bank bits being 0000, and the row and column addresses each having ten bits.

Note that because the original bank bit location of the presented address is part of the row address in this example some mechanism must be used to reconstruct the proper memory bank (as shown in FIG. 2) of memory 13. This is accomplished by adding back the data from bank register 36, FIG. 3. In the example, as shown in line 7 of FIG. 4, this number is 0101 which is the number 5 and corresponds to the lowest bank number of memory 13 as can be seen in FIG. 2. This yields an address as shown in line 8 of FIG. 4, with the bank register bits being added, and the row and column bits being 10 bits wide.

Returning now to FIG. 3, it will be seen that the sign bit which was stored in address register 32 also is used to select the low format or high format for determining whether the memory requires an 8 bit or a 10 bit address. This is done by low format register 35 or high format register 34 under control of the sign bit output of address register 32. Note that any number of address bits can be controlled and the numbers 8 and 10 are used as an example.

Continuing now in FIG. 3, shifters 303, 304 and 305 control the row, column and bank shifting to the address output multiplexer which consists of elements 313 through 319. These elements operate in the well-known fashion such that element 313 is the bank address output multiplexer with register 314 being the bank output address register. Element 315 is the row address output multiplexer with register 316 being the row output address register. Element 317 is the column output address multiplexer with register 318 being the column address register. Multiplexer 319 is the row/column output multiplexer which generates the address used by the physical memory. The row and column outputs for multiplexer 319 are controlled by the column select signal from the timing RAM on a programmable basis. Details of the operation of the timing RAM are contained in copending concurrently filed and commonly owned patent application, Ser. No. 07/414,106, entitled "Memory Controller Flexible Timing Control System and Method", which application is hereby incorporated by reference herein.

Comparator 38 is an address comparator which compares the current row and bank addresses to a newly presented row and bank addresses to determine whether or not the new address is in the same row and same bank as the current address. The information from comparator 38 is not necessary for the operation of the invention described herein. However, this output can be used to control systems which rely upon the knowledge of having data selected from the same row. Such a system is shown in the above-identified concurrently filed patent application.

Screen refresh controller 312 generates a screen refresh address. The screen refresh address is then shifted to generate a bank, row, and column address under control of low format register 35. This row, column, and bank address is also sent to the address output multiplexer to control memory 12.

DRAM refresh controller 37 generates the bank and row addresses necessary for refreshing both memories 12 and 13. DRAM refresh controller 37 has support for controlling two different memories by having two independent refresh counters which have independently programmable refresh times.

It should be noted that while a subtraction operation is disclosed many different types of logic operations can be performed to arrive at the required memory decision.

What is claimed is:

1. A memory system operable for processing pixel information in response to data and commands from a processor, said system comprising:

an image memory controller;

a first memory having a first set of operating parameters said first memory comprising a video memory;

a second memory having a second set of operating parameters said second memory comprising a dynamic memory;

means controlled by said image memory controller for establishing a single full contiguous address space encompassing said first memory and said second memory; and means for connecting said image memory controller to both said first memory and said second memory to determine into which of said first memory and said second memory to store the data and controlling access to said first memory and said second memory in response to said determination while preserving said first set of operating parameters and said second set of operating parameters.

2. The system of claim 1, further comprising:

means for establishing an address boundary between said first memory and said second memory independent of memory capacity within said first memory and said second memory; and means for selectively changing said address boundary.

3. The system of claim 2, wherein said selectively changing means includes a register in said memory system for accepting address bits from the processor.

4. The system of claim 1, wherein said image memory controller further comprises:

means for accepting address bits from the processor; and means operative in response to accepted ones of said address bits for controlling said image memory controller in response to said operating parameters of said memories.

5. The system of claim 2, wherein said first memory and second memory each have different amounts of addressable locations controlled by address words having different respective bit lengths, and wherein said system further comprises:

means for accepting a memory address word from said processor, said address word having the same number of bits regardless of whether said bits represent addresses in said first memory or in said second memory.

6. The system of claim 5, wherein said accepting means includes:

means for storing a number representative of whether said address word controls an address location of said first memory; and means, including performing an arithmetic operation involving said stored number and said provided address, for determining which of said first memory or said second memory said provided address is addressing.

7. The system of claim 6, wherein said determining means includes detection means for detecting whether said arithmetic operation yields a positive value.

8. The system of claim 6, further comprising means operative in response to said determining means for arranging a provided address word into row and column words having n bits each when said address word is destined for said first memory and for arranging said provided address word into row and column words having m bits each when said address word is destined for said second memory.

9. The system of claim 8, wherein each of said first memory and said second memory comprises a plurality of individual memories arranged into consecutive banks, and wherein:

said arranging means further includes means for adjusting the n bits and said m bits of said provided address word in accordance with said determining means.

10. A method of operating a memory system arranged for processing pixel information in response to data and commands from a processor to an image memory controller arranged to control a first memory having a first set of operating parameters and a second memory having a second set of operating parameters, said method comprising the steps of:

establishing, under control of said image memory controller, a single fully contiguous address space encompassing both of said first memory and said second memory, said first memory comprising a video random access memory, said second memory comprising a dynamic random access memory; and controlling memory access to said first memory and said second memory under control of said image memory controller in response to the data from the processor while preserving said first set of operating parameters and said second set of operating parameters.

11. The method of claim 10, further comprising a step of establishing an address boundary between said first memory and said second memory independent of memory capacity of said first memory and said second memory, and selectively changing said address boundary.

12. The method of claim 11, wherein said selectively changing step includes accepting within a register associated with said single fully contiguous address space a plurality of address bits from the processor.

13. The method of claim 12, wherein said image memory controller accepts externally provided data bits, and further including the step of:

controlling said first set of operating parameters and said second set of operating parameters in response to accepted ones of said address bits.

14. The method of claim 13, wherein said first memory and said second memory each have different amounts of addressable locations controlled by address words having different respective bit lengths, and wherein said method further comprises the step of:

accepting a memory address word from said processor, said address word having the same number of bits regardless of whether said bits represent addresses in said first memory or in said second memory.

15. The method of claim 14, wherein said accepting step includes the steps of:

storing a number representative of whether said address word controls an address location in said first memory; and subtracting a stored number from said memory address word for determining whether said address word controls an address location in said first memory.

16. The method of claim 15, wherein said subtracting step includes the step of determining a sign of a value resulting from said subtraction.

17. The method of claim 16, further comprising the step of arranging, in response to said sign of said value, said memory address word into row and column words having n bits, respectively, when said memory address word is destined for said first memory and for arranging said memory address word into row and column words having m bits, respectively, when said memory address word is destined for said second memory.

18. The method of claim 17, wherein said first memory and said second memory each comprise a plurality of individual memories arranged into consecutive banks, and wherein said method further comprises the step of:

adjusting said n bits and said m bits of said memory address word in accordance with said sign of said value.

* * * * *